United States Patent
Sethi et al.

(10) Patent No.: US 11,449,374 B2
(45) Date of Patent: Sep. 20, 2022

(54) METHOD AND APPARATUS FOR PROACTIVELY COUNTERING THE EFFECTS OF STORAGE DEVICE FAILURE

(71) Applicant: Dell Products L.P., Round Rock, TX (US)

(72) Inventors: Parminder Singh Sethi, Ludhiana (IN); Chandroma Ghose, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/155,801

(22) Filed: Jan. 22, 2021

(65) Prior Publication Data

US 2022/0237065 A1 Jul. 28, 2022

(51) Int. Cl.
G06F 11/30 (2006.01)
G06F 11/07 (2006.01)
G06F 1/20 (2006.01)

(52) U.S. Cl.
CPC .......... *G06F 11/0727* (2013.01); *G06F 1/206* (2013.01); *G06F 11/3034* (2013.01); *G06F 11/3058* (2013.01)

(58) Field of Classification Search
CPC ............. G06F 11/0727; G06F 11/3058; G06F 11/3034; G06F 1/206; G06F 11/3051; G06F 11/0751
See application file for complete search history.

(56) References Cited

U.S. PATENT DOCUMENTS

| | | | |
|---|---|---|---|
| 7,146,521 B1* | 12/2006 | Nguyen | G06F 3/0634 714/E11.005 |
| 11,019,754 B2* | 5/2021 | Kharisov | G06F 1/3287 |
| 2017/0160771 A1* | 6/2017 | Albrecht | G06F 1/206 |
| 2017/0315599 A1* | 11/2017 | Marripudi | G06F 1/206 |
| 2019/0278648 A1* | 9/2019 | Nayak | G06F 11/0793 |
| 2020/0057478 A1* | 2/2020 | Hsieh | G06F 11/3034 |

* cited by examiner

*Primary Examiner* — Yolanda L Wilson
(74) *Attorney, Agent, or Firm* — Daly, Crowley Mofford & Durkee, LLP

(57) ABSTRACT

A method, comprising: detecting that a storage device is experiencing a failure, the storage device being part of a computing device; identifying a cooling fan that is associated with the storage device, the cooling fan being part of the computing device, the cooling fan being identified based on one or more data structures that map the cooling fan to the storage device; and increasing a speed of the cooling fan from a first speed level to a second speed level, the speed of the cooling fan being increased in response to detecting that the storage device is experiencing the failure, wherein the speed of the cooling fan is increased proactively.

17 Claims, 9 Drawing Sheets

410

| | | |
|---|---|---|
| SECTION 302A | COOLING FAN 210A | ⎯412A |
| SECTION 302B | COOLING FAN 210B | ⎯412B |
| SECTION 302C | COOLING FAN 210C | ⎯412C |
| SECTION 302D | COOLING FAN 210D | ⎯412D |

| | | |
|---|---|---|
| SECTION 302A | LAN CONNECTOR COMPONENT 208A | ⎯422A |
| SECTION 302A | LAN CONTROLLER COMPONENT 208B | ⎯422B |
| SECTION 302B | SERIAL CONNECTOR COMPONENT 208C | ⎯422C |
| SECTION 302B | SERIAL PORT SHARING COMPONENT 208D | ⎯422D |
| SECTION 302B | MOTHERBOARD SERIAL CONTROLLER 208E | ⎯422E |
| SECTION 302C | BASEBOARD MANAGEMENT CONTROLLER 208F | ⎯422F |
| SECTION 302C | SYSTEM INTERFACE COMPONENT 208G | ⎯422G |
| SECTION 302D | BASEBOARD MANAGEMENT CONTROLLER 208F | ⎯422H |
| SECTION 302D | SYSTEM INTERFACE 208G | ⎯422I |
| SECTION 302D | SENSORS AND CONTROL CIRCUITRY 208H | ⎯422J |

FIG. 4B

| | |
|---|---|
| 900 | |
| COOLING FAN 210A | LAN CONNECTOR COMPONENT 208A |
| COOLING FAN 210A | LAN CONTROLLER COMPONENT 208B |
| COOLING FAN 210B | SERIAL CONNECTOR COMPONENT 208C |
| COOLING FAN 210B | SERIAL PORT SHARING COMPONENT 208D |
| COOLING FAN 210B | MOTHERBOARD SERIAL CONTROLLER 208E |
| COOLING FAN 210C | BASEBOARD MANAGEMENT CONTROLLER 208F |
| COOLING FAN 210C | SYSTEM INTERFACE COMPONENT 208G |
| COOLING FAN 210D | BASEBOARD MANAGEMENT CONTROLLER 208F |
| COOLING FAN 210D | SYSTEM INTERFACE COMPONENT 208G |
| COOLING FAN 210D | SENSORS AND CONTROL CIRCUITRY 208H |

METHOD AND APPARATUS FOR PROACTIVELY COUNTERING THE EFFECTS OF STORAGE DEVICE FAILURE

CROSS-REFERENCE TO RELATED APPLICATIONS

The present application is related to U.S. patent application Ser. No. 17/155,223, entitled "METHOD AND SYSTEM FOR DETERMINING COMPUTER FAN USAGE AND MAINTENANCE", by inventors Parminder Singh Seth and Chandroma Ghose, which is herein incorporated by reference in its entirety.

BACKGROUND

A computer system typically includes electronic components that are housed inside a computer system enclosure. Computer system enclosures often have severe space limitations, which makes their cooling more challenging and critical. At present, many computer systems use cooling fans to control the temperature of their components. Such cooling fans can be mounted on the walls of an enclosure or on various electronic components.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting that a storage device is experiencing a failure, the storage device being part of a computing device; identifying a cooling fan that is associated with the storage device, the cooling fan being part of the computing device, the cooling fan being identified based on one or more data structures that map the cooling fan to the storage device; and increasing a speed of the cooling fan from a first speed level to a second speed level, the speed of the cooling fan being increased in response to detecting that the storage device is experiencing the failure, wherein the speed of the cooling fan is increased proactively.

According to aspects of the disclosure, a system is provided, comprising: a memory; a plurality of cooling fans; a plurality of storage devices; and at least one processor that is operatively coupled to the memory, the at least one processor being configured to perform the operations of: detecting that one of the plurality of storage devices is experiencing a failure; selecting one of the plurality of cooling fans that is associated with the storage device experiencing the failure, the selection being performed based on one or more data structures that map the selected cooling fan to the storage device experiencing the failure; and increasing a speed of the selected cooling fan from a first speed level to a second speed level, wherein the speed of the selected cooling fan is increased proactively.

According to aspects of the disclosure, a non-transitory computer-readable medium is provided that stores one or more processor-executable instructions, which, when executed by at least one processor, cause the at least one processor to perform the operations of: detecting that a storage device is experiencing a failure, the storage device being part of a computing device; identifying a cooling fan that is associated with the storage device, the cooling fan being part of the computing device, the cooling fan being identified based on one or more data structures that map the cooling fan to the storage device; and increasing a speed of the cooling fan from a first speed level to a second speed level, the speed of the cooling fan being increased in response to detecting that the storage device is experiencing the failure, wherein the speed of the cooling fan is increased proactively.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4A is a diagram of an example of a data structure, according to aspects of the disclosure;

FIG. 4B is a diagram of an example of a data structure, according to aspects of the disclosure;

FIG. 9 is a diagram of an example of a data structure, according to aspects of the disclosure.

DETAILED DESCRIPTION

Figure 1:
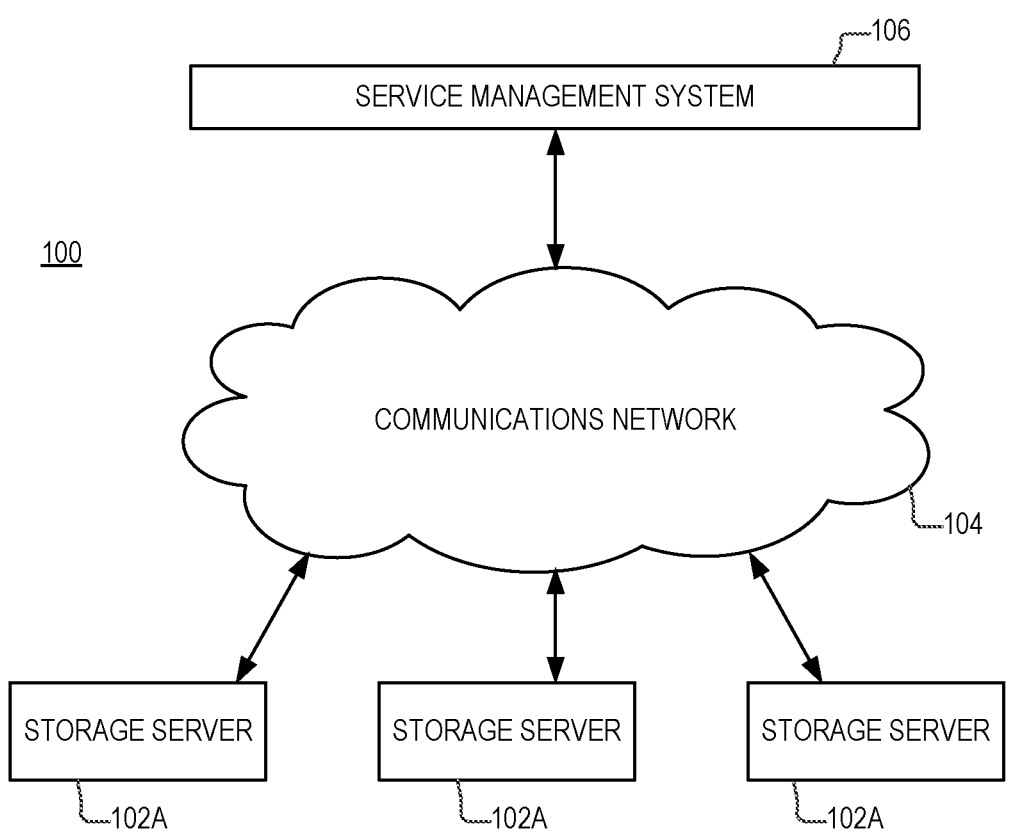
FIG. 1 is a diagram of an example of a system, according to aspects of the disclosure.

FIG. 1 is a diagram of an example of a system 100, according to aspects of the disclosure. As illustrated, the system 100 may include a plurality of storage servers 102A-C that are coupled to a service management system 104 via a communications network 106. The communications network 106 may include one or more of the Internet, a local area network (LAN), a wide area network (WAN), and/or any other suitable type of network. The service management system 104 may include one or more computing devices, such as the computing device 800, which is discussed further below with respect to FIG. 8. The service management system 104 may be configured to monitor the health of storage devices that are part of the storage servers 102A-C. The service management system 104 may be further configured to place service requests for storage devices that fail. In some implementations, the service management system 104 may be configured to perform a process 500, which is discussed further below with respect to FIG. 5

Figure 2:
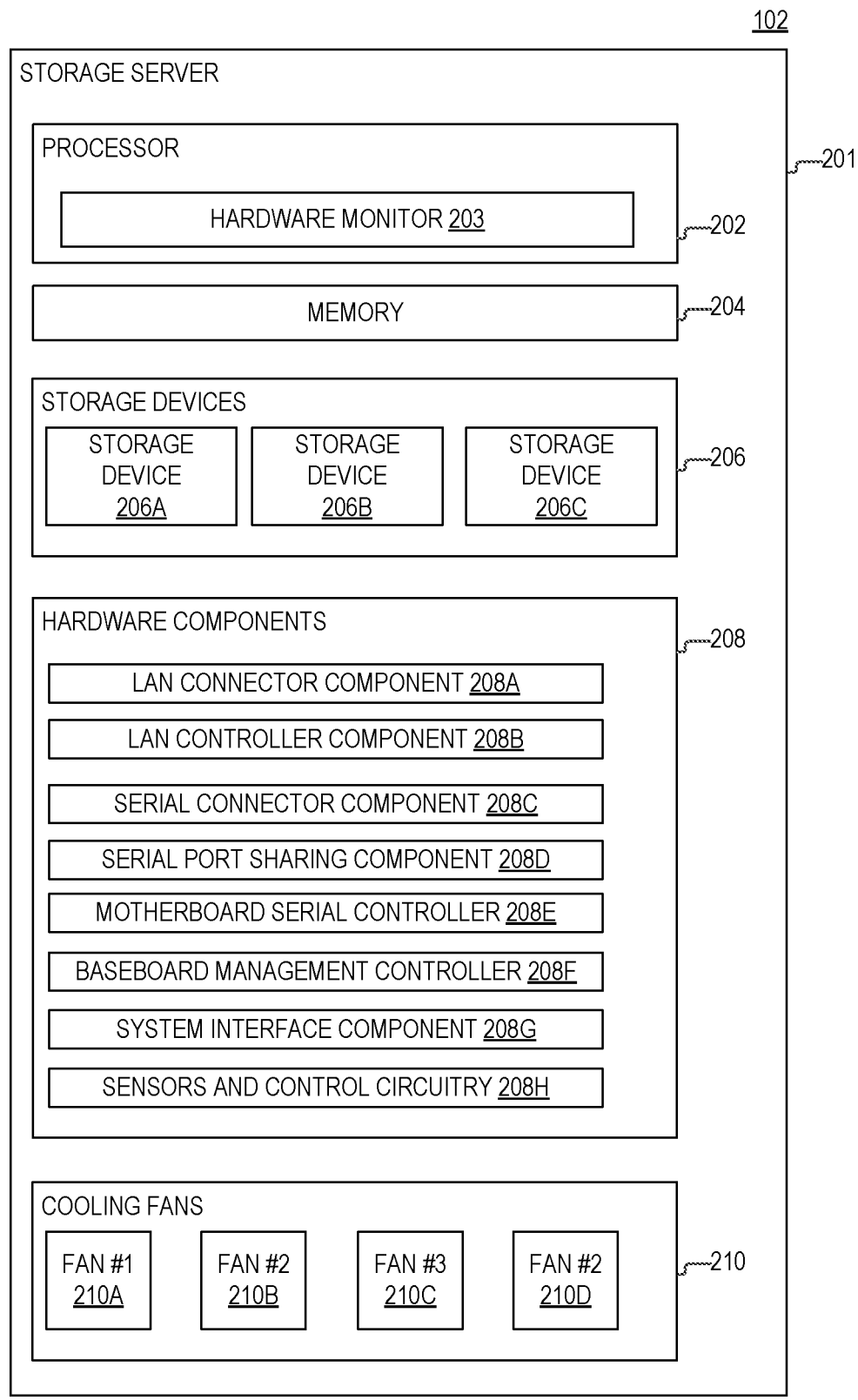
FIG. 2 is a diagram of an example of a storage server, according to aspects of the disclosure.

FIG. 2 is a diagram of an example of a storage server 102, according to aspects of the disclosure. As the numbering suggests, the storage server 102 may be the same or similar to any of the storage servers 102A-C, which are discussed above with respect to FIG. 1.

The storage server 102 may include an enclosure 201 that is arranged to house a processor 202, a memory 204, one or more storage devices 206, one or more hardware components 208, and one or more cooling fans 210. The enclosure 201 may include an ATX case (or chassis), a blade server case (or chassis), and/or any other suitable type of electronic device enclosure. The processor 202 may include one or of a general-purpose processor (e.g., an x86 processor or an ARM-based processor), an application-specific integrated circuit (ASIC), a field-programmable gate array (FPGA), and/or any other suitable type of processing circuitry. The memory 202 may include any suitable type of volatile or non-volatile memory, such as an Electrically Erasable Programmable Read-Only Memory (EEPROM), a Synchronous Dynamic Random-Access Memory (SDRAM), a solid-state drive (SSD), a hard disk (HD).

The storage devices 206 may include storage devices 206A, 206B, and 206C. Although in the example of FIG. 2, the storage server 102 includes three storage devices 206, alternative implementations are possible in which the storage server includes any number of storage devices 206. For example, in some implementations, the storage server 102 may include one (1) storage device 206, eight (8) storage devices 206, or thirty-two (32) storage devices 206, etc. According to the example of FIG. 2, each of the storage devices 206 includes a hard disk. However, alternative implementations are possible in which any of the storage devices 206 includes a solid-state drive (SSD), a non-volatile random-access memory (nvRAM) device and/or any other suitable type of storage device.

The hardware components 208 may include any other suitable type of electronic component that is part of the storage server 102. The components 208 may include components that are soldered on a motherboard (not shown) of the storage server 102 and/or components that are separate of the motherboard. The components 208 may include a LAN connector component 208A, a LAN controller component 208B, a serial connector component 208C, a serial port sharing component 208D, a motherboard serial controller 208E, a baseboard management controller 208F, a system interface component 208G, and sensor and control circuitry 208H.

The cooling fans 210 may include a cooling fan 210A, a cooling fan 210B, a cooling fan 210C, and a cooling fan 210D. According to the example of FIG. 2, each of the cooling fans 210A-D is a case fan. As used throughout the disclosure, the term "case fan" shall refer to a fan that is mounted on an exterior or interior panel of the enclosure 201. For example, any of the cooling fans 210A-D may be mounted on the face of an enclosure or a back wall of the enclosure. As another example, any of the cooling fans 210A-D may be mounted on a sidewall of the enclosure. As yet another example, any of the cooling fans 210A-D may be mounted on an interior wall or panel of the enclosure. In some implementations, any of the cooling fans 210A-D may be either an intake fan (e.g., a fan that brings cool air into the enclosure 201) or an outtake fan (e.g., a fan that removes hot air from the enclosure 201). Although in the example of FIG. 2 each of the cooling fans 210A-D is a case fan, alternative implementations are possible in which any of the cooling fans 210A-D is another type of fan. For example, any of the cooling fans may include a heatsink-mounted fan, such as a video card fan, a CPU fan, a memory bridge fan, and/or any other suitable type of fan. Stated succinctly, the present disclosure is not limited to any specific implementation of the cooling fans 210A-D.

The processor 202 may be configured to execute a hardware monitor 203. The hardware monitor 203 may be arranged to monitor the health of any of the storage devices 206A-C. In some implementations, the hardware monitor 203 may receive telemetry data from any of the storage devices 206A-C and forward the telemetry data to the service management system 104. In some implementations, in addition to (or instead of) forwarding the telemetry data, the hardware monitor 203 may process the telemetry data to determine whether any of the storage devices 206A-C is experiencing a failure. When any of the storage devices 206A-C is experiencing a failure, the hardware monitor 203 may transmit a message to the service management system 104 indicating that the storage device is experiencing a failure. The telemetry data may include any telemetry data that is supported by a storage device, such as read error rate, throughput performance, Solid-State Drive (SSD) erase fail count, SSD wear-leveling count, spin-up time, seek error rate, seek time performance, and or any other suitable type of telemetry data. In some implementations, a storage device may be experiencing a failure if one or more telemetry data values that are provided by the storage device are outside of their normal operating range.

The hardware monitor 203 may be further arranged to monitor the temperature of at least some of the components 208. In operation, the hardware monitor 203 may receive one or more temperature readings. Each temperature reading may be generated by a respective temperature sensor that is part of the storage server 102 and/or one of the components 208. Each temperature reading may identify the temperature of one or more of the components 208. When the temperature reading for a given component 208 exceeds a predetermined temperature threshold (e.g., a threshold that is associated with the given component 208), the hardware monitor 203 may determine that the given component 208 is overheating (or is at risk of overheating). In response to detecting that the given component 208 is overheating (or is at risk of overheating), the hardware monitor 203 may generate a temperature alert for the given component 208. The hardware monitor 203 may transmit the temperature alert to the service management system 104 or provide the temperature alert to other software that is running on the storage server 102. In some implementations, the temperature alert may include a message that indicates that the given hardware component 208 is overheating (or is at risk of overheating).

Although in the example of FIG. 2 the hardware monitor 203 is implemented in software, alternative implementations are possible in which the hardware monitor 203 is implemented in hardware or as a combination of software and hardware. Although in the present example, the hardware monitor 203 includes a single application or process, alternative implementations are possible in which the hardware monitor 203 includes a collection of applications (and/or a collection of processes), which together perform the functions ascribed to the hardware monitor 203 by the examples of FIGS. 1-9. Stated succinctly, the present disclosure is not limited to any specific implementation of the hardware monitor 203.

Figure 3:
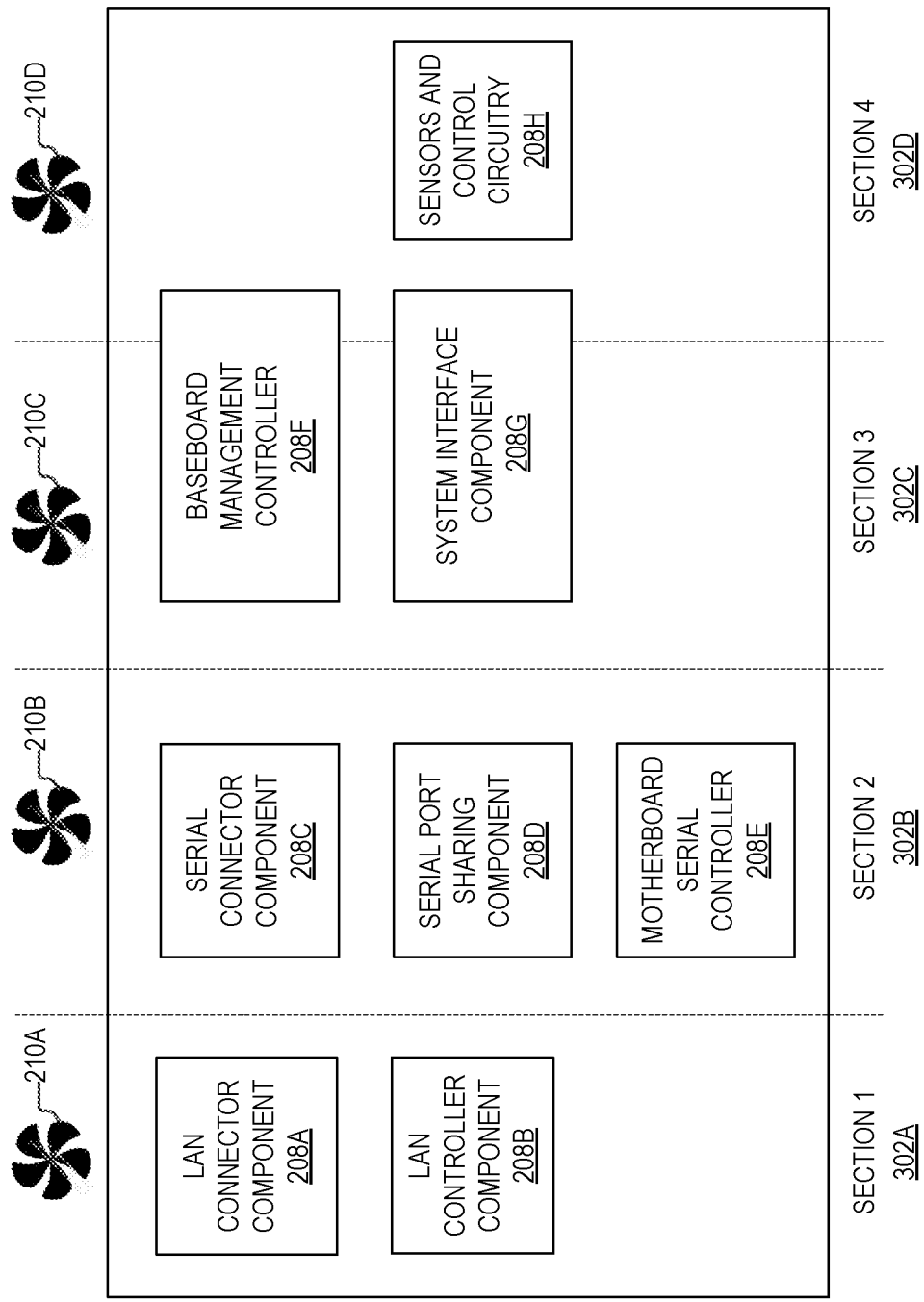
FIG. 3 is a diagram illustrating aspects of the storage server of FIG. 2, according to aspects of the disclosure.

FIG. 3 is a schematic diagram illustrating an aspect of the operation of the storage server 102. FIG. 3 shows that the storage server 102 may be divided into a plurality of virtual sections 302. Each section 302 may correspond to a different one of the cooling fans 210, which regulates the cooling for that section. According to the example of FIG. 3, section 302A includes the LAN connector component 208A and the LAN controller component 208B. Section 302A is cooled by cooling fan 210A, such that cooling fan 210A has the highest impact on the cooling of section 302A among the cooling fans 210A-D. Section 302B includes the serial port sharing component 208D, the serial connector component 208C, and the motherboard serial controller 208E. Section 302B is cooled by cooling fan 210B, such that cooling fan 210B has the highest impact on the cooling of section 302B among the cooling fans 210A-D. Section 302C includes a portion of the baseboard management controller 208E and a portion of the system interface component 208G. Section 302C is cooled by cooling fan 210C, such that cooling fan 210C has the highest impact on the cooling of section 302C among the cooling fans 210A-D. Section 302D includes a portion of the baseboard management controller 208E, a portion of the system interface component 208G, and the sensors and control circuitry 208H. Section 302D is cooled by cooling fan 210D, such that cooling fan 210C has the highest impact on the cooling of section 302D among the cooling fans 210A-D.

FIG. 4A is a diagram of an example of a data structure 410 that maps the virtual sections 302 to their respective cooling fans 210. The data structure 410 may be stored in the memory of the storage server 102 (shown in FIG. 2) and/or the memory of the service management system 104 (shown in FIG. 1). The data structure 410 may include entries 412A-D. According to the example of FIG. 4A, entry 412A indicates that section 302A is cooled by cooling fan 210A; entry 412B indicates that section 302B is cooled by cooling fan 210B; entry 412C indicates that section 302C is cooled by cooling fan 210C; and entry 412D indicates that section 302D is cooled by cooling fan 210D.

FIG. 4B is a diagram of an example of a data structure 420 that maps each of the hardware components 208 to the section(s) 302, which the hardware component 208 is part of. The data structure 420 may be stored in the memory of the storage server 102 (shown in FIG. 2) and/or the memory of the service management system 104 (shown in FIG. 1) The data structure 420 may be used in conjunction with the data structure 410 to relate each of the hardware components 208 to the cooling fan that is (primarily) responsible for cooling that component. The data structure 410 may include entries 422A-J. According to the example of FIG. 4B, entry 422A indicates that LAN connector component 208A is part of section 302A; entry 422B indicates that LAN controller component 208B is part of section 302A; entry 422C indicates that the serial connector component 208C is part of section 302B; entry 422D indicates that the serial port sharing component 208D is part of section 302B; entry 422E indicates that the motherboard serial controller 208E is part of section 302B; entry 422F indicates that the baseboard management controller 208F is part of section 302C; entry 422G indicates that the system interface component 208G is part of section 302C; entry 422H indicates that the baseboard management controller 208F is also part of section 302D; entry 422I indicates that the system interface component 208G is also part of section 302D. And entry 422J indicates that the sensors and control circuitry 208H is part of section 302D. In some implementations, the definitions of the sections 302A-D, which are shown in FIG. 4B may be generated in accordance with the methods discussed in U.S. patent application Ser. No. 17/155.223, entitled METHOD AND SYSTEM FOR DETERMINING COMPUTER FAN USAGE AND MANTENANCE, which, as noted above, is incorporated by reference into the present disclosure.

Figure 5:
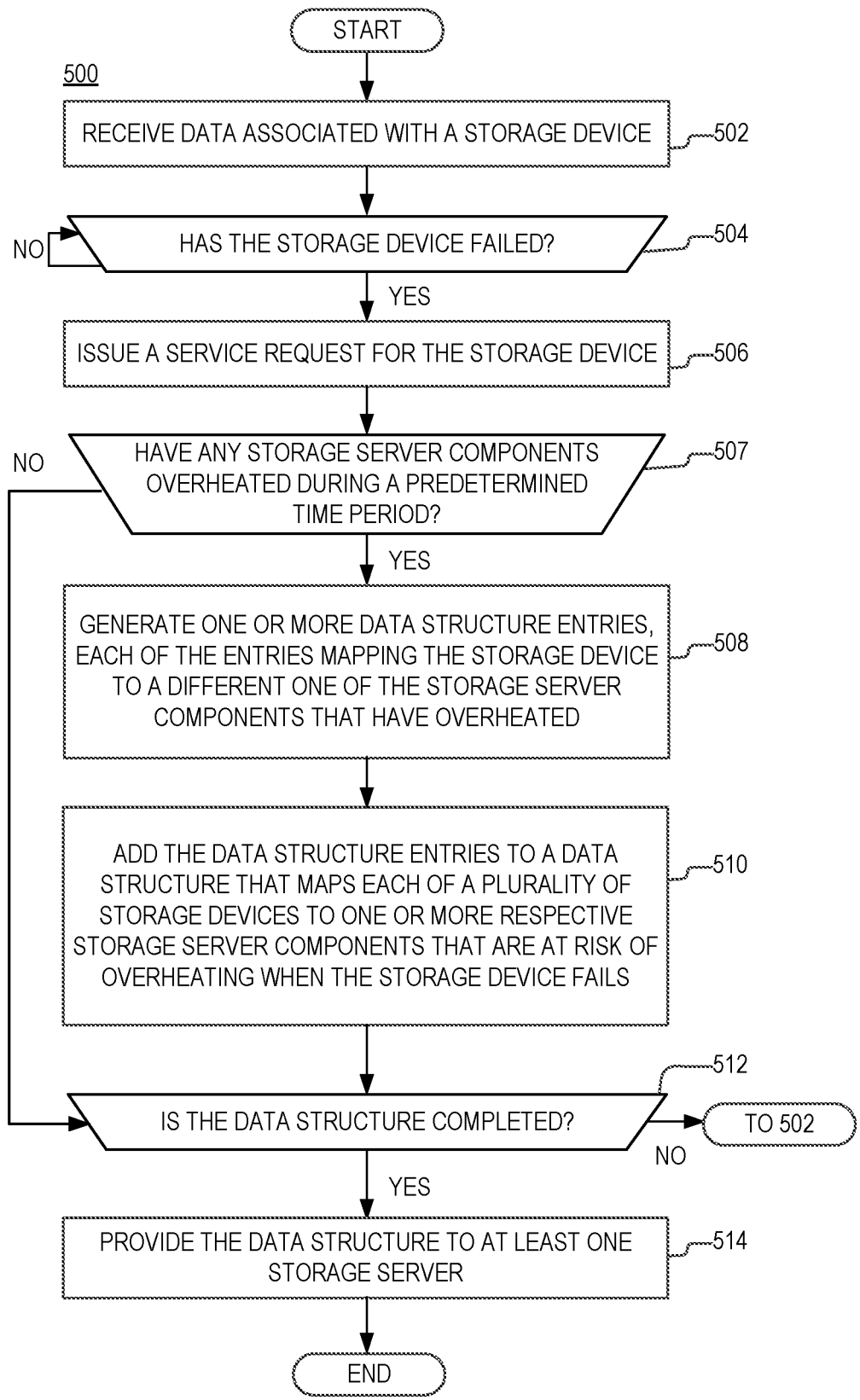
FIG. 5 is a flowchart of an example of a process, according to aspects of the disclosure.

FIG. 5 is a flowchart of an example of a process 500, according to aspects of the disclosure. According to the example of FIG. 5, the process 500 is performed by the service management system 104 (shown in FIG. 1). However, alternative implementations are possible in which the process 500 is, at least in part, performed by any of the storage servers 102A-C (shown in FIG. 2). Stated succinctly, the present disclosure is not limited to any specific implementation of the process 500.

At step 502, the service management system 104 receives data that is associated with a storage device 206. The storage device 206 may be part of any of the storage servers 102A-C. As noted above, each of the storage servers 102A-C (shown in FIG. 1) may have the same configuration as the storage server 102 (shown in FIG. 2). Accordingly, each of the storage servers 102A-C may include a respective set of storage devices 206 (as shown in FIG. 2), a respective set of components 208 (as shown in FIG. 2), and a respective instance of the hardware monitor 203. The data associated with the storage device 206 may be generated by an instance of the hardware monitor 203 that is part of the same storage server 102 as the storage device 206. As noted above, the data may include at least one of (i) telemetry data indicating the health of the storage device and/or (ii) a message generated by the hardware monitor 203, which indicates whether the storage device is experiencing a failure.

At step 504, the service management system 104 determines whether the storage device is experiencing a failure based on the data (received at step 502). If the storage device is experiencing a failure, the process 500 proceeds to step 506. Otherwise, step 504 is repeated.

At step 506, the service management system 104 issues a service request for the storage device 206. The service request may be logged in a database, from where it can be retrieved and examined by technical personnel. If the technical personnel determine that the storage device is covered by a warranty (or another replacement plan), the technical personnel may replace the storage device.

At step 507, the service management system 104 detects whether any of the components 208 (that are part of the same storage server as the failed storage device) have overheated (or are at risk of overheating). Detecting (by the service management system 104) of whether any of the components 208 has overheated (or is at risk of overheating) may include detecting whether a temperature alert is received for the component at the service management system 104. If a temperature alert is received for at least one of the components 208 (that are part of the same storage server as the failed storage device), the process 500 proceeds to step 508. Otherwise, if none of the components 208 has overheated, the process 500 proceeds to step 512.

Figure 6:
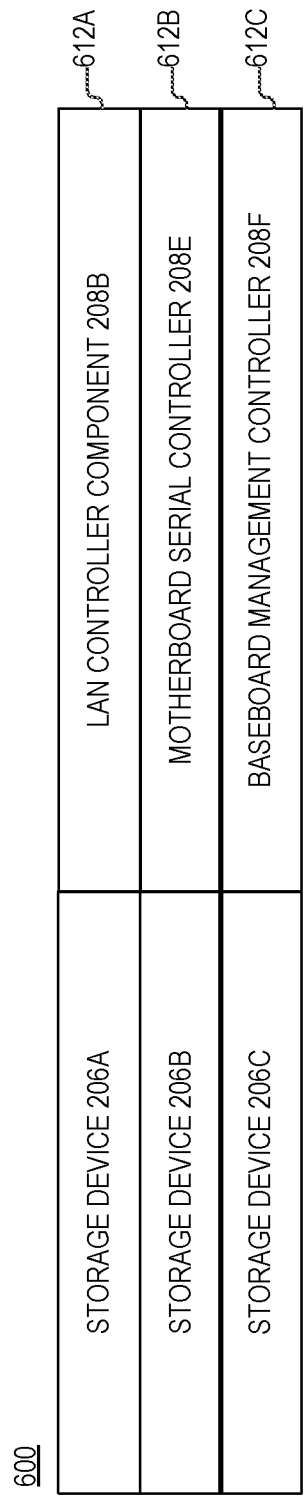
FIG. 6 is a diagram of an example of a data structure, according to aspects of the disclosure.

At step 508, the service management system 104 generates one or more data structure entries 612 (shown in FIG. 6). Each data structure entry 612 may map the storage device to a different one of the components 208 that are found to have overheated (at step 507).

At step 510, the service management system 104 adds the data structure entries 612 to a data structure 600 (shown in FIG. 6). The data structure 600, is discussed further below with respect to FIG. 6.

At step 512, the storage management system detects whether the generation of the data structure 600 is completed. If the generation of the data structure 600 is completed, the process 500 proceeds to step 514. Otherwise, the process 500 returns to step 502, and the data structure 600 is updated further.

At step 514, the service management system 104 provides the data structure to one or more of the storage servers 102A-C (shown in FIG. 1).

In some respects, when a storage device is experiencing a failure, the storage device may start to run hot, thus generating excessive heat. In other words, when the storage device is experiencing a failure, the storage may begin to generate more heat than it normally does. The excessive heat may be generated because of factors, such as the speed of an actuator arm of the storage device increasing or greater sound wave generation. Because a storage device that is experiencing a failure may remain inside a storage server for a certain period of time (before it is replaced), the excessive heat generated by the storage device can accumulate and cause one or more of the components 208 to overheat (and/or become damaged).

The process 500 determines which one(s) of the components 208 (in any of the storage servers 102A-C) may be affected by excessive heat, if a given storage device 206 (in the same storage server) were to fail. Due to airflow patterns of the storage servers' enclosures 201, different components 208 may be affected when different storage devices 206 devices fail. According to the process 500, when the service management system 104 detects that one of the storage devices 206 is experiencing a failure, the service management system 104 identifies any components 208 that have overheated during a predetermined time period (following the failure of the storage device 206). Any components 208 that are found to have overheated during the predetermined time period are presumed to have overheated because of excessive heat that is produced as a result of the failure in the storage device.

In some implementations, when it is determined that a failed storage device can be replaced, the service management system 104 may obtain a date (and/or another indication of time) by which the storage device is expected to be replaced. The date (and/or other indication of time) may be calculated, in a well-known fashion, by the service management system 104 and/or obtained from the technical support personnel. The predetermined time period in which the service management system 104 detects whether any of the components 208 have overheated may start when the storage device is found to be experiencing a failure and end when the storage device is expected to be replaced (or is finally replaced).

FIG. 6 is a diagram of an example of a data structure 600, according to aspects of the disclosure. The data structure 600 may include a plurality of entries 612. Each of the entries 612 may map an identifier corresponding to a storage device 206 to a second identifier of a component 208 that is at risk of overheating (or expected to overheat) when the storage device is experiencing a failure. In some implementations, the data structure 600 may be generated by executing the process 500, which is discussed above with respect to FIG. 5. According to the example of FIG. 6, entry 612A indicates that when the storage device 206A is experiencing a failure, the excessive heat that is generated by the storage device 206A (while the storage device 206A is experiencing the failure) may cause the LAN controller component 208B to overheat (or be at risk of overheating). Entry 612B indicates that, when the storage device 206B is experiencing a failure, the excessive heat that is generated by the storage device 206B (while the storage device 206B is experiencing the failure) may cause the motherboard serial controller 208E to overheat (or be at risk of overheating). And entry 612C indicates that, when the storage device 206C is experiencing a failure, the excessive heat that is generated by the storage device 206C (while the storage device 206C is experiencing the failure) may cause the baseboard management controller 208F to overheat (or be at risk of overheating).

FIGS. 5-6 is provided for illustrative purposes only. According to the example of a FIGS. 5-6, a single failure of a component 208, after a storage device has failed, is sufficient to map the hardware component to the storage device (in the data structure 600). However, it will be clear to those skilled in the art, after reading this disclosure, that alternative implementations are possible in which component 208 is mapped to a hardware device only if the correlation between overheating events (e.g., events that warrant the generation of a temperature alert) experienced by the component 208 and a failure in a given storage device 206 exceeds a threshold. In some respects, the correlation may be manifested by the count of overheating events for the component 208, which are experienced when the given storage device 206 fails. As can be readily appreciated, the service management system 104 may be able to collect a sufficient data set for measuring the correlation between overheating events and storage device failures because the service management system 104 may receive data (at step 502) from many different storage servers.

According to the example of FIG. 5, the service management system 104 collects information about which components 208 generate temperature alerts when a particular storage device 206 is experiencing a failure. However, alternative implementations are possible in which this information is collected in a de-centralized manner. In such implementations, each of the storage servers 102A-C may independently collect information about which components 208 (of the storage server) generate temperature alerts when a particular storage device 206 (of the same storage server) is experiencing a failure. The individual data sets that are collected by the storage servers 102A-C may be subsequently aggregated (and/or otherwise combined), by the service management system 104 or another entity, to generate the data structure 600. It will be understood that the present disclosure is not limited to any specific method for generating the data structure 600.

Figure 7:
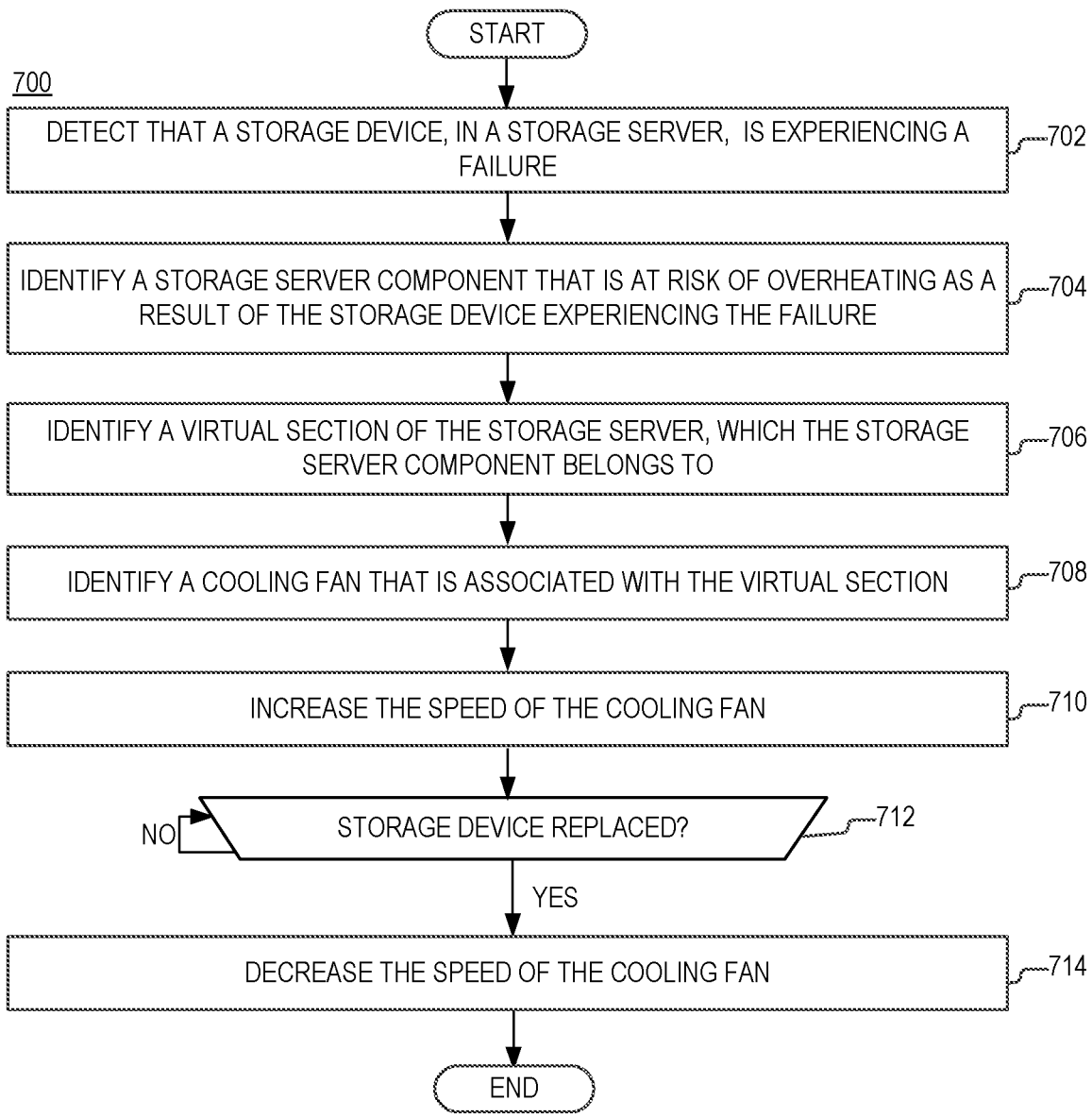
FIG. 7 is a flowchart of an example of a process, according to aspects of the disclosure.

FIG. 7 is a flowchart of an example of a process 700, according to aspects of the disclosure. According to the example of FIG. 7, the process 700 is performed by the hardware monitor 203 of the storage server 102 (shown in FIG. 2). The example of FIG. 7 assumes that each of the data structures 410, 420, and 600 is stored in the memory 204 of the storage server 102. However, it will be understood that alternative implementations are possible in which the data structures 410, 420, and 600 are stored at another location and accessed remotely by the storage server 102.

At step 702, the hardware monitor 203 detects that one of the storage devices 206A-C is experiencing a failure. The detection is based on telemetry data that is provided by the storage device. According to the present example, the hardware monitor 203 detects that the storage device 206A is experiencing a failure based on telemetry data that is provided by the storage device 206A.

At step 704, the hardware monitor 203 identifies a component 208 that is at risk of overheating because of excessive heat produced by the storage device 206A. As noted above, the excessive heat may be generated as a result of the storage device 206A experiencing a failure. Identifying the component 208 may include performing a search of the data structure 600 to identify a component 208 that is mapped to the storage device 206 by one or more entries 612 in the data structure 600. According to the present example, the hardware monitor 203 detects that the LAN controller component 208B is at risk of overheating as a result of the storage device 206A experiencing a failure.

At step 706, the hardware monitor 203 identifies a virtual section 302 of the storage server 102, which the component 208 (identified at step 704) is part of. The virtual section 302 may be identified by performing a search of the data structure 420 (shown in FIG. 4B) to identify a virtual section that is mapped to the component 208 (identified at step 704). According to the present example, the hardware monitor 203 detects that the LAN controller component 208B is part of section 302A.

At step 708, the hardware monitor 203 identifies a cooling fan that is associated with the virtual section 302 (identified at step 706). The cooling fan may be identified by performing a search of the data structure 410 (shown in FIG. 4A) to identify a cooling fan that is associated with the virtual section 302 (identified at step 706). According to the present example, the hardware monitor 203 detects that the cooling fan 210A is associated with the virtual section 302A.

At step 710, the hardware monitor 203 increases the speed of the cooling fan that is identified at step 708. The speed of the cooling fan is increased from a first speed level (e.g., 1500 RPM) to a second speed level (e.g., 2500 RPM). The speed of the cooling fan is increased proactively, irrespective of the current temperature of the component 208 (identified at step 704). According to the present disclosure, the phrase "increasing the speed of a cooling fan irrespective of the current temperature of a component" shall mean that the current temperature of the component has no effect on whether the speed of the cooling fan is increased. Under this definition, the speed of the fan may be increased when the current temperature of the component is below a temperature threshold for the component or above the temperature threshold for the component. In some implementations, the current temperature of the storage device 206 that is experiencing the failure may not be a factor in the increase of the speed of the identified cooling fan. For example, the speed of the cooling fan may be increased if the current temperature of the failed storage device is within its normal range or if the current temperature of the storage device is outside of the normal range.

In some implementations, increasing the speed of the cooling fan proactively is advantageous because it may prevent thermal damage (or shortening of useful life) of the in component 208 (identified at step 704). As noted above, the speed of the cooling fan may be increased before the component 208 has overheated and/or before a temperature alert is generated for the component (identified at step 704) by the hardware monitor 203.

At step 712, the hardware monitor 203 detects whether the storage device that is experiencing a failure has been replaced. If the storage device has been replaced, the process 700 proceeds to step 714. Otherwise, step 712 is repeated again.

At step 714, the hardware monitor 203 decreases the speed of the cooling fan (identified at step 708). In some implementations, the speed of the cooling fan may be decreased back to the first speed level. Or alternatively, the speed of the cooling fan may be decreased to a speed level that is different from the first speed level.

FIG. 7 is provided for illustrative purposes only. Although in the example of FIG. 7, data structures 410, 420, and 610 are used to map a storage device that is experiencing a failure to a cooling fan (whose speed is subsequently increased), it will be understood that the present disclosure is not limited to any specific method for performing the mapping. For example, alternative implementations are possible in which a single data structure is used, which maps directly any given one of the storage devices 206A-C to one or more cooling fans 210A-D whose speed needs to be increased when the given storage device is experiencing a failure. An example of one such data structure is the data structure 900, which is shown in FIG. 9. Although in the example of FIG. 7, the speed of a single fan is increased at step 710, alternative implementations are possible in which the speed of multiple cooling fans is instead. Although in the example of FIG. 7, only one component 208 is identified at step 704, alternative implementations are possible in which multiple components 208 are identified. In such implementations, the speed of all or any cooling fans that are associated with the components 208 (e.g., by data structures 410 and 420) may be increased. The term "data structure" as used throughout the disclosure shall refer to any plurality of data items (e.g., entries, mappings, etc.). The data items may or may not be grouped together in the same entity or at the same memory location. In this regard, it will be understood that the disclosure is not limited to any specific implementation of the data structures 410, 420, and 600.

According to the example of FIG. 7, the process 700 is performed by the storage server 102 (e.g., the process 700 can be performed by any of the storage servers 102A-C). However, alternative implementations are possible in which the process 700 is performed, at least in part, by the service management system 104. In such implementations, the service management system 104 may receive telemetry data that indicates whether any of the storage devices 206 in the storage servers 102 has failed. If the service management system 104 detects that any of the storage devices has failed, the service management system 104 may identify a cooling fan that is associated with the failed storage device (e.g., by using data structures 410, 420, and 600) and issue a remote command causing the speed of the cooling fan to be increased.

Figure 8:
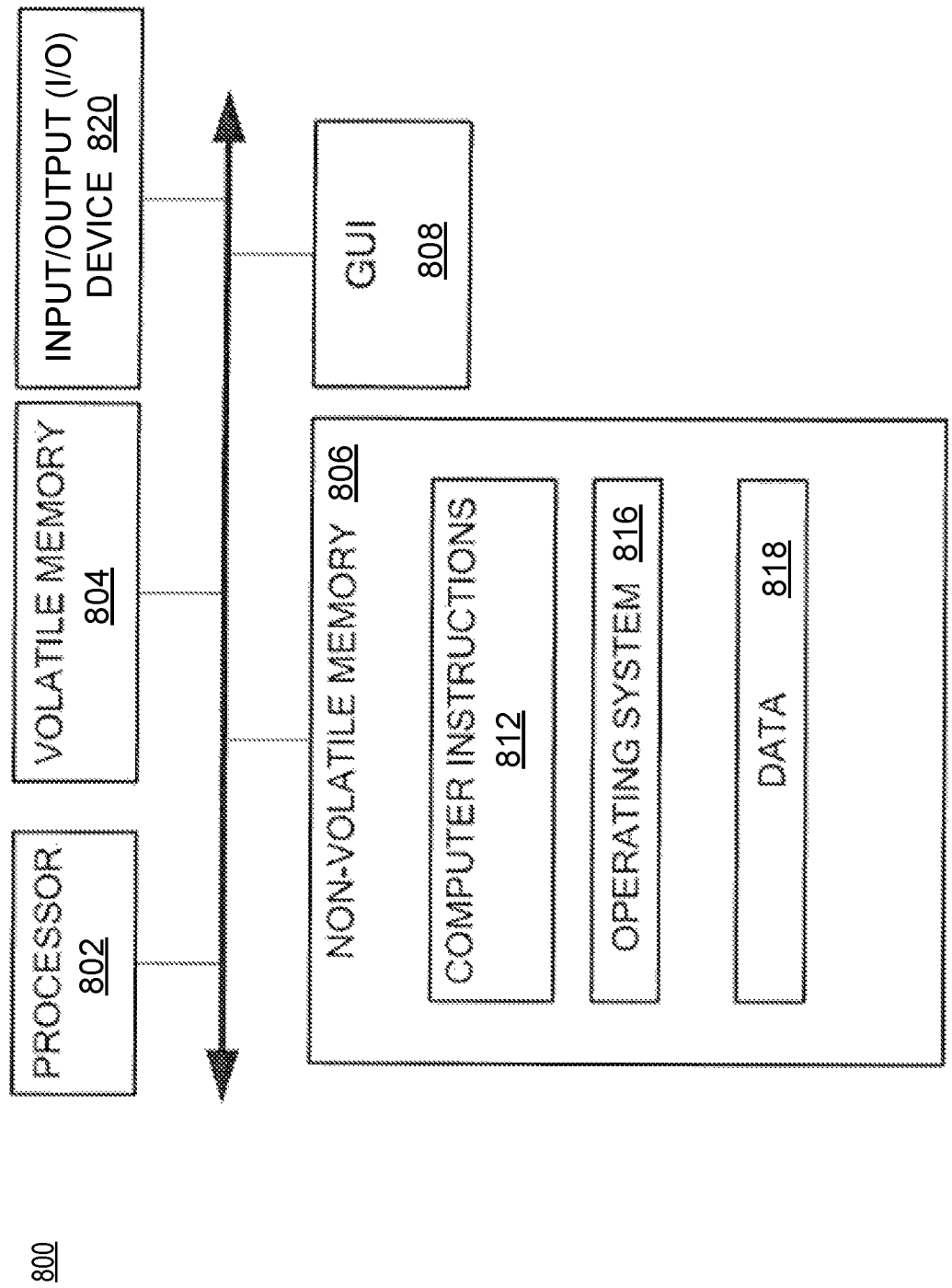
FIG. 8 is a diagram of an example of a computing device, according to aspects of the disclosure.

Referring to FIG. 8, computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9 are provided as an example only. At least some of the steps discussed with respect to FIGS. 1-9 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The inventiom claimed is:

1. A method, comprising:
  detecting that a storage device is experiencing a failure, the storage device being part of a computing device;
  identifying a cooling fan that is associated with the storage device, the cooling fan being part of the computing device, the cooling fan being identified based on one or more data structures that map the cooling fan to the storage device; and
  increasing a speed of the cooling fan from a first speed level to a second speed level, the speed of the cooling fan being increased in response to detecting that the storage device is experiencing the failure;

detecting that the storage device has been replaced, and decreasing the speed of the cooling fan to the first speed level or another speed level in response to the storage device being replaced.

2. The method of claim 1, wherein the storage device includes a hard disk.

3. The method of claim 1, wherein the one or more data structures include a data structure that maps each of a plurality of virtual sections of the computing device to a respective cooling fan.

4. The method of claim 1, wherein the cooling fan includes a case fan that is configured to cool a section of the computing device that is associated with a component of the computing device, the component being one that is at risk of overheating as a result of excessive heat being generated by the storage device while the storage device is experiencing the failure.

5. The method of claim 1, wherein speed of the identified cooling fan is increased by at least one of: (i) software that is executing on the computing device and (ii) a remote management system.

6. The method of claim 1, wherein the speed of the cooling fan is increased before a temperature alert is generated for any component of the computing device that is being cooled by the cooling fan.

7. A system, comprising:
a memory;
a plurality of cooling fans;
a plurality of storage devices; and
at least one processor that is operatively coupled to the memory, the at least one processor being configured to perform the operations of:
detecting that one of the plurality of storage devices is experiencing a failure;
selecting one of the plurality of cooling fans that is associated with the storage device experiencing the failure, the selection being performed based on one or more data structures that map the selected cooling fan to the storage device experiencing the failure;
increasing a speed of the selected cooling fan from a first speed level to a second speed level;
detecting that the storage device has been replaced, and decreasing the speed of the cooling fan to the first speed level or another speed level in response to the storage device being replaced.

8. The system of claim 7, wherein the storage device experiencing the failure includes a hard disk.

9. The system of claim 7, wherein the one or more data structures include a data structure that maps each of a plurality of virtual sections of the system to a respective one of the plurality of cooling fans.

10. The system of claim 7, wherein the selected cooling fan includes a case fan that is configured to cool a section of the system that is associated with a component of the system, the component being one that is at risk of overheating as a result of excessive heat being generated by the storage device while the storage device is experiencing the failure.

11. The system of claim 7, wherein the speed of the cooling fan is increased before a temperature alert is generated for any component of the system that is being cooled by the cooling fan.

12. A non-transitory computer-readable medium storing one or more processor-executable instructions, which, when executed by at least one processor, cause the at least one processor to perform the operations of:
detecting that a storage device is experiencing a failure, the storage device being part of a computing device;
identifying a cooling fan that is associated with the storage device, the cooling fan being part of the computing device, the cooling fan being identified based on one or more data structures that map the cooling fan to the storage device;
increasing a speed of the cooling fan from a first speed level to a second speed level, the speed of the cooling fan being increased in response to detecting that the storage device is experiencing the failure;
detecting that the storage device has been replaced; and
decreasing the speed of the cooling fan to the first speed level or another speed level in response to the storage device being replaced.

13. The non-transitory computer-readable medium of claim 12, wherein the storage device includes a hard disk.

14. The non-transitory computer-readable medium of claim 12, wherein the one or more data structures include a data structure that maps each of a plurality of virtual sections of the computing device to a respective cooling fan.

15. The non-transitory computer-readable medium of claim 12, wherein the cooling fan includes a case fan that is configured to cool a section of the computing device that is associated with a component of the computing device, the component being one that is at risk of overheating as a result of excessive heat being generated by the storage device while the storage device is experiencing the failure.

16. The non-transitory computer-readable medium of claim 12, wherein speed of the identified cooling fan is increased in response to an instruction that is received by the at least one processor from a remote management system.

17. The non-transitory computer-readable medium of claim 12, wherein the speed of the cooling fan is increased before a temperature alert is generated for any component of the computing device that is being cooled by the cooling fan.

* * * * *